United States Patent [19]

Maxwell

[11] 3,964,388

[45] June 22, 1976

[54] METHOD AND APPARATUS FOR HIGH SPEED NON-IMPACT PRINTING WITH SHADE-OF-GREY CONTROL

[75] Inventor: James C. Maxwell, Winchester, Mass.

[73] Assignee: The Carter's Ink Company, Cambridge, Mass.

[22] Filed: Mar. 4, 1974

[21] Appl. No.: 447,669

[52] U.S. Cl. .............................. 101/426; 346/74 ES; 101/DIG. 13; 178/6.6 A; 340/169; 355/17

[51] Int. Cl.² ..................... G01D 15/10; H04N 1/00

[58] Field of Search............. 101/1 R, DIG. 13, 129, 101/426; 96/1 R; 355/3, 16, 17; 340/169; 346/74 R, 74 S, 74 SB, 74 SC, 74 ES, 135; 178/6.6 B, 6.7 R; 219/383; 315/225, 291; 357/17, 19

[56] References Cited

UNITED STATES PATENTS

| | | | |
|---|---|---|---|
| 3,304,430 | 2/1967 | Biard et al. | 357/19 |
| 3,550,153 | 12/1970 | Haeberle et al. | 346/135 X |
| 3,554,123 | 1/1971 | Lewallen | 101/426 X |
| 3,613,103 | 10/1971 | Harris | 346/74 R |
| 3,631,509 | 12/1971 | Marshall | 101/DIG. 13 X |
| 3,667,007 | 5/1972 | Kressel et al. | 357/17 |
| 3,753,231 | 8/1973 | Hilsum | 357/17 |
| 3,757,174 | 9/1973 | Shigemasa et al. | 357/17 |
| 3,762,811 | 10/1973 | Matsumoto | 355/17 |
| 3,773,417 | 11/1973 | Pressman et al. | 96/1 R X |
| 3,823,262 | 7/1974 | Adams et al. | 178/6.6 B |

OTHER PUBLICATIONS

College Physics, Mendenhall–Eves–Keys–Sutton, D.

*Primary Examiner*—E. H. Eickholt
*Attorney, Agent, or Firm*—Kenway & Jenney

[57] ABSTRACT

A high speed non-impact printing means including (1) a non-impact printer having at least one pair of print electrodes, and a recipient sheet and closely spaced donor sheet positioned between the print electrodes, with the donor sheet having a substantially uniform distribution of electrically conductive, mobile printing particles dispersed near the surface thereof adjacent to the recipient sheet, (2) a print signal generator, (3) a variable coupling means associated with each print electrode pair for connecting the associated electrode pair to the print signal generator, and (4) a coupling control means for selectively varying the coupling afforded by each of said coupling means. Each variable coupling means comprises an optically controlled variable capacitance device which may be selectively controlled by the control means to couple the associated print electrode pair with the print signal generator by a predetermined capacitance. The electric field between each electrode pair, as established by the print signal coupled from the associated generator, is effective to transfer a plurality of the printing particles from the donor sheet to the recipient sheet, wherein the number of particles so transferred is related to the intensity of the electric field between the associated print electrodes.

27 Claims, 4 Drawing Figures

METHOD AND APPARATUS FOR HIGH SPEED NON-IMPACT PRINTING WITH SHADE-OF-GREY CONTROL

BACKGROUND OF THE INVENTION

This invention relates to printing and more particularly to high speed non-impact printing.

High speed non-impact printers are described in U.S. Pat. No. 3,550,153, issued to R. Haeberle et al. and assigned to the assignee of the present invention. Such printers include one or more print electrode pairs (comprising a field shaping electrode and a base electrode) configured about a donor sheet and a recipient sheet. On or near the surface of the donor sheet adjacent to the recipient sheet, thee is a relatively uniform reservoir of electrically conductive, mobile printing particles. The application of an electrical printing pulse signal across a print electrode pair, and the resultant pulsed electrical field, effects the transfer of mobile printing particles from regions on the surface of the donor sheet through which the electric field passes to adjacent regions on the surface of the recipient sheet.

Generally, each print electrode pair in such a printer is associated with an individual print signal generator which may be selectively activated to apply the printing pulse. The print signal generators for a printing means may have the form of one of many means known in the art for selectively generating high voltage pulse signals in response to a control signal. For example, a transistor switch may be used to drive a step-up transformer having its output connected across the print electrode pair. However, such print signal generators impose substantial limitations on the printing means since each print electrode pair requires an associated print signal generator including a transistor switch and a step-up transformer. A first such limitation is the substantial power dissipation and cost associated with the generation of a high voltage print pulse using the step-up transformer circuit configuration.

A second limitation is evident in printing means which utilize a multiple print electrode pair configuration, e.g., in an array of selectively operable cylindrical field shaping electrodes associated with a common base electrode. Due to the number of circuit elements and the physical size associated with each separate print signal generator (one for each electrode pair), a substantial limitation is imposed on the printing electrode size and spacing (and, as a result, printing resolution).

In addition, in such a multiple electrode printing means, the print signal generator associated with each print electrode pair generally provides printing pulses of a single voltage amplitude and consequent printing having a single optical density. Therefore, unless a substantially more complex (and correspondingly more expensive) pulse generator is provided for each printing electrode pair which is capable of providing controlled voltage amplitude printing pulses to selective printing electrode pairs, only two tone (e.g., black-white) printing may be achieved.

SUMMARY OF THE INVENTION

Accordingly, an object of the present invention is to provide a high-speed, non-impact printing means having an improved print signal generating means.

A further object is to provide a high-speed, non-impact printing means having a means for controlling the optical density of the printed image.

In accordance with the present invention, high-speed, non-impact printing means comprises a Haeberle-type non-impact printer, an electrical print signal generator, a variable coupling means for coupling print signals from the generator to the printer, and a control means for selectively varying the coupling coefficient of the coupling means.

The Haeberle-type printer, as taught in U.S. Pat. No. 3,550,153, includes at least one pair of print electrodes, and a recipient sheet and a donor sheet positioned between each print electrode pair. The donor sheet includes a substantially uniform distribution of electrically conductive, mobile printing particles dispersed near the surface of the donor sheet which is adjacent to the recipient sheet.

Alternatively, the non-impact printer may comprise a corona discharge device having a field shaping electrode and base electrode. Such a device may be used in a two step printing system wherein a latent image of electrostatic charge is first generated by producing a corona discharge across a recipient sheet, and then printing particles are applied thereto, wherein the printing particles adhere to the recipient sheet at the charged portions of the latent image.

The print signal generator may be one of the many known types which may provide a high voltage a.c. signal (e.g., 800 volts peak-to-peak, at 5 KHz) across a resistive capacitive load, (e.g., a parallel configuration of a 1 M ohm resistor and a 10 picofarad capacitor).

The variable coupling and control means comprise an optically coupled variable capacitance device.

The control means further includes a means for generating a control signal for controlling the capacitance of the coupling means, and consequently the coupling of the print signal generator to the print electrode pair (which may be characterized as a capacitive load).

For the Haeberle-type printer, the control means may be selectively controlled to adjust the coupling coefficient of a variable coupling means associated with a print electrode pair so that a.c. print signal (and corresponding electric field) having a predetermined amplitude is established between the associated electrode pair. In response thereto, printing particles in the region of the field are transferred from the donor sheet to the recipient sheet. The number of particles so transferred (and consequently the optical density of the resultant image formed on the recipient sheet) is related to the amplitude of the print signal coupled from the generator and applied across the print electrodes.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
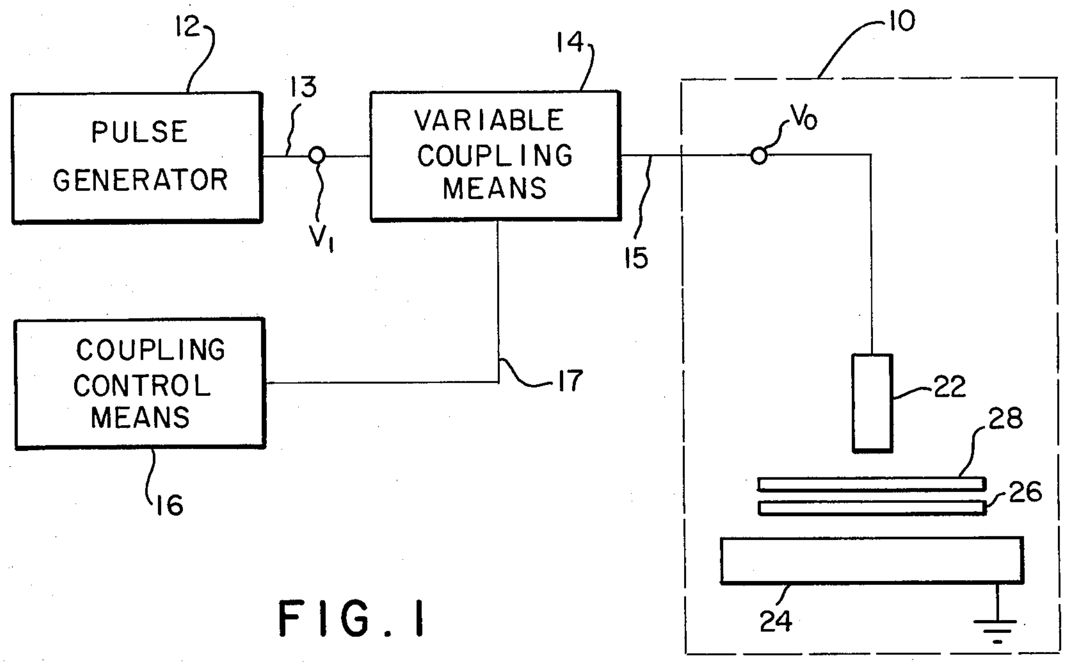
FIG. 1 shows, partially in block diagram and partially in schematic form, a high speed, non-impact printing means having shade-of-grey printing control.

In accordance with the present invention, a printing means is shown in FIG. 1 to comprise a non-impact electric pulse printer 10 as taught by Haeberle in U.S. Pat. No. 3,550,153, a print signal generator 12, a variable coupling means 14 and a coupling control means 16.

The printer 10, generator 12, and control means 16 are connected to the coupling means 14 via lines 15, 13 and 17, respectively.

The printer 10 includes a field shaping electrode 22, a grounded base electrode 24, a donor sheet 26, and a recipient sheet 28. The donor sheet 26 includes a substantially uniform distribution of electrically conductive mobile printing particles dispersed near the surface of sheet 26 which is adjacent to the recipient sheet. It will be understood that in FIG. 1, the relative dimensions of the printer 10 are exaggerated for clarity.

Figure 2:
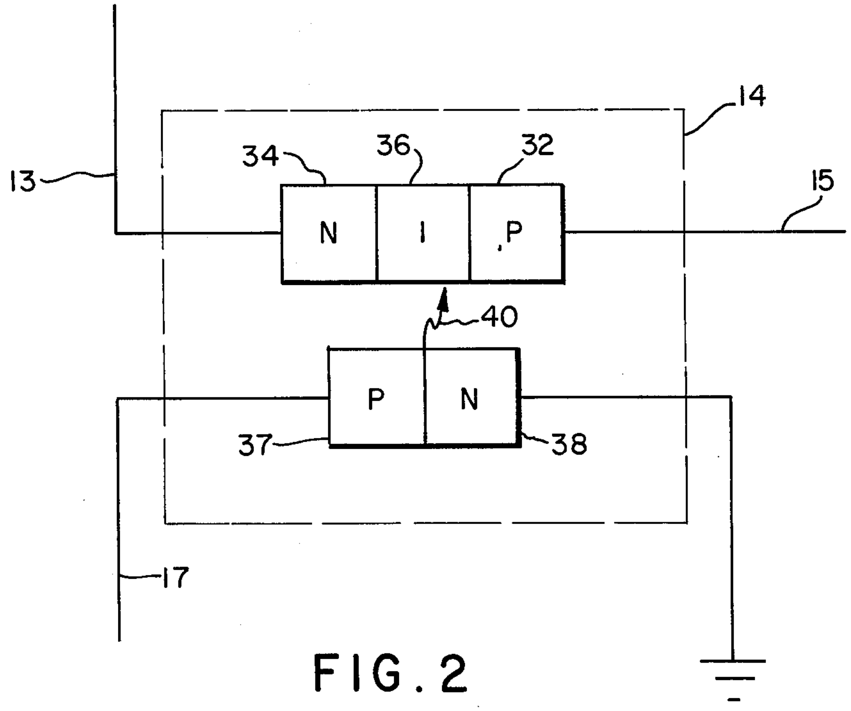
FIG. 2 shows, in schematic form, an optically controlled variable coupling device for the embodiment of FIG. 1, and FIGS. 3 and 4 show, partially in block diagram and partially in schematic form, embodiments of a high speed, non-impact, multiple print electrode printing means having shade-of-grey printing control.

An exemplary variable coupling means 14 is shown in FIG. 2 to include an optically controlled variable capacitance device. Accordingly, the coupling means 14 includes a PIN diode having a substantially doped n region 34 connected to line 13, a substantially doped p region 32 connected to the line 15 and an intrinsic region 36, separating regions 32 and 34. The coupling means 14 further includes a light emitting diode (LED) having a p region 37 and an adjacent n region 38. The p region 36 is connected to line 17 and the n region is connected to ground. The LED is positioned so that light emitted from the LED is incident upon the intrinsic region 36 of the PIN diode. The resultant optical coupling is indicated in FIG. 2 by the arrow 40.

For the presently described embodiment, it is assumed that the print signal generator 12 provides electrical pulse signals of appropriate magnitude and duration to print an image with the printer 10 as taught by Haeberle. For example, an 800 volt, 5 microsecond print pulse may be used with a printer having a fine wire field shaping electrode of diameter 0.004 inches which is spaced 0.004 inches from a planar base electrode. The control means 16 is an adjustable d.c. current source which may drive a desired forward current through the LED.

In operation, the coupling means 14 is effective in response to the control means 16 to couple a print signal on line 13, as produced by the generator 12, to the line 15, whereupon that coupled print signal is applied across the print electrodes 22 and 24. When the electric field thereby established between electrodes 22 and 24 has sufficient magnitude, as described by Haeberle, a plurality of printing particles from the donor sheet 26 are charged and transferred to the closely spaced recipient sheet 28 under the influence of the electric field. The number of printing particles so transferred is related to the intensity of the electric field between electrodes 22 and 24. Thus, by appropriately varying the coupling afforded by coupling means 14, an amplitude scaled print signal may be applied across electrodes 22 and 24.

In an alternative configuration, the generator 12 may provide a high voltage a.c. signal in lieu of a single pulse signal. By appropriately controlling the coupling afforded by coupling means 14, a high voltage, a.c. signal burst of desired duration may be applied across electrodes 22 and 24. For example, using the printer configuration described above, generator 12 may provide a 1600 volt peak-to-peak sinusoidal signal at 160KHz, and the coupling means 14 may be varied so that a 50 microsecond burst of a 1500 volt peak-to-peak signal is applied across electrodes 22 and 24. In this configuration, the application of a bipolar print signal across electrodes 22 and 24 is effective to alternately produce positive and negative electric fields between those electrodes. As a result, the particles which are deposited on the recipient sheet produce a zero net charge build-up on that sheet, with substantially half of the deposited particles having a negative charge and the remaining deposited particles having a positive charge.

In the illustrated embodiments, an optically variable capacitance device may provide an effective capacitance which varies in response to a control current applied to the LED. Using such a device in coupling means 14 wherein the control means 16 provides the LED control current via line 17, the PIN diode capacitance $C_e$ effectively couples the print signal generator 12 to the printer 10. The printer 10 may be characterized as an effective capacitance $C_s$, which for practical printer configurations may be on the order of 10–20 picofarads. Accordingly, the amplitude of the print signal $V_o$ as applied across electrodes 22 and 24 may be expressed in terms of the amplitude of the signal produced by the print signal generator, $V_i$, in the following manner:

$$V_o = (C_e\ C_e + C_s)\ V_i \tag{1}$$

In an embodiment where the PIN diode capacitance $C_e$ bears the relationship to the LED current as noted above, the coupling afforded by coupling network 14 may be in the approximate range of 10 to 90%, depending on the range of the LED current provided by control means 16. Further, since the number of printing pargicles transferred from the donor sheet 26 to the recipient sheet 28 is dependent on the magnitude of the electric field between electrodes 22 and 24, control of the LED current affords control of the spatial density of the printing particles deposited on the recipient sheet, with a corresponding control of the optical density of those deposited particles. Thus, scale-of-grey printing may be achieved using the abovedescribed configuration.

Figure 3:
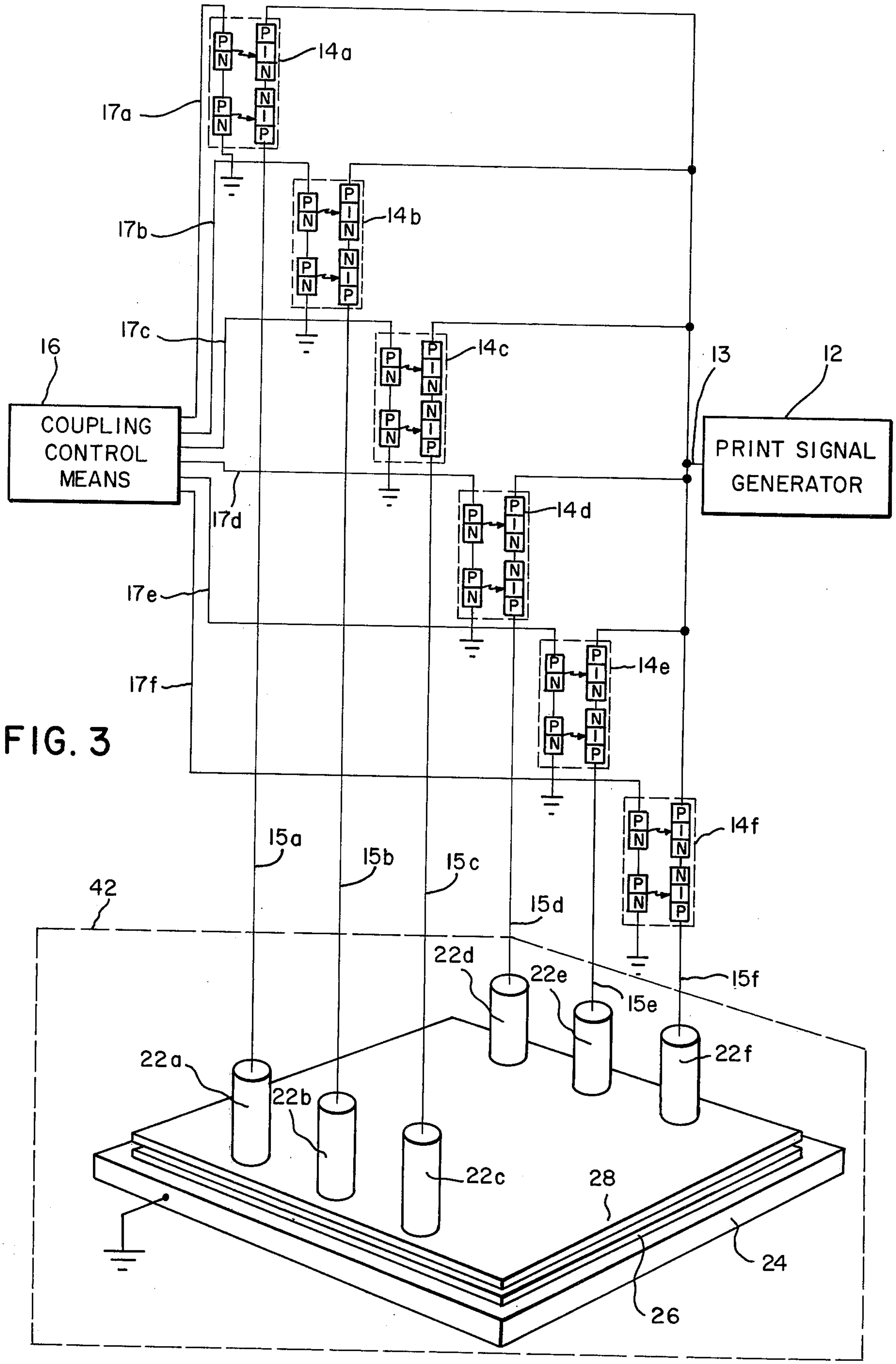

FIG. 3 shows an embodiment of the present invention having a multiple print electrode printer 42. In that figure, elements corresponding to similar elements in FIGS. 1 and 2 are denoted by identical reference numerals. The printer 42 includes a rectangular array of six cylindrical field shaping electrodes **22*a–f* arranged over a single grounded base electrode 24. Donor and recipient sheets 26 and 28 are positioned between the electrodes 22*a–f* and electrode 24. It will be understood that an insulating supportive medium may be utilized to appropriately position electrodes 22*a–f*. Each of electrodes 22*a–f* is coupled by way of the corresponding one of lines 15*a–f* and coupling means 14*a–f*, and line 13 to the print signal generator 12. Each of the coupling means 14*a–f* comprise a pair of PIN diodes connected back-to-back and a pair of optically coupled LED's, thereby permitting coupling of bipolar signals from line 13 to the respective ones of lines 15*a–f*. The LED's of the coupling means 14*a–f* are connected by the corresponding one of lines 17*a–f*** to the coupling control.

In operation, the coupling control means 16 may selectively control the coupling afforded by the various coupling means 14*a–f* by applying appropriate amplitude d.c. currents to the LED's (in the LED forward direction) in the manner described above in conjunction with FIGS. 1 and 2. Consequently, a print signal applied from generator 12 on line 13 may be selectively coupled to the various field shaping electrodes 22*a–f*, with the amplitude of the signal applied to the respective electrodes being dependent on the magnitude of the coupling afforded by the associated coupling means. In this manner, shade-of-grey printing control may be achieved for a two dimensional array of print electrodes such as may be used in a facsimile printing system.

It will be understood that the multiple print electrode printer 42 is exemplary and that other printers may include more than six field shaping electrodes. In such printers, the field shaping electrodes may be arranged in any desired configuration, subject to limitations on print electrode separation (and thus resolution) based on (1) overlapping of the electric fields emanating from adjacent field shaping electrodes, (2) location, physical size, and power dissipation associated with the elements of electrical print signal generating and coupling networks.

In the present embodiment, the optically controlled variable capacitance device in each of the coupling means 14*a–f* is a relatively small, low power solid-state device which permits use of a single remote print signal generator with a multiple print electrode printer. Further, the field shaping electrodes may include the PIN diodes of the associated coupling means as an integral portion of those electrodes, with one of the $p^+$ or $n^+$ regions forming the print face. Consequently, such a printer may provide a substantially improved resolution characteristic (primarily limited only by the field distribution) compared with such printers of the prior art, such as may require a separate print signal generator (comprising a transistor switch and relatively large, high power step-up transformer) in association with each field shaping electrode.

It will be understood that in such prior art devices, the print signal generators (i.e., the transformers) are required to be located in close proximity to the field shaping electrodes (severely limiting the electrode spacing, and, consequently, resolution) in order to avoid cross-talk problems between adjacent high voltage print signal coupling lines running from the various transformers to the associated field shaping electrodes and also to limit wiring capacitance associated with those lines. On the other hand, in the embodiment of FIG. 3, the print signal generator 12 may be remote from the printer 42 since the signal line 13 couples the high voltage printing pulse to the coupling means 14*a–f* and the coupling means are sufficiently small and characterized by sufficiently low power dissipation so that each coupling means may be positioned in close proximity to the associated field shaping electrode without limiting the resolution beyond those already imposed by the adjacent field in interference limitations. As noted above, the PIN diode portion of each coupling means may comprise an integral portion of the associated field shaping electrode.

Figure 4:
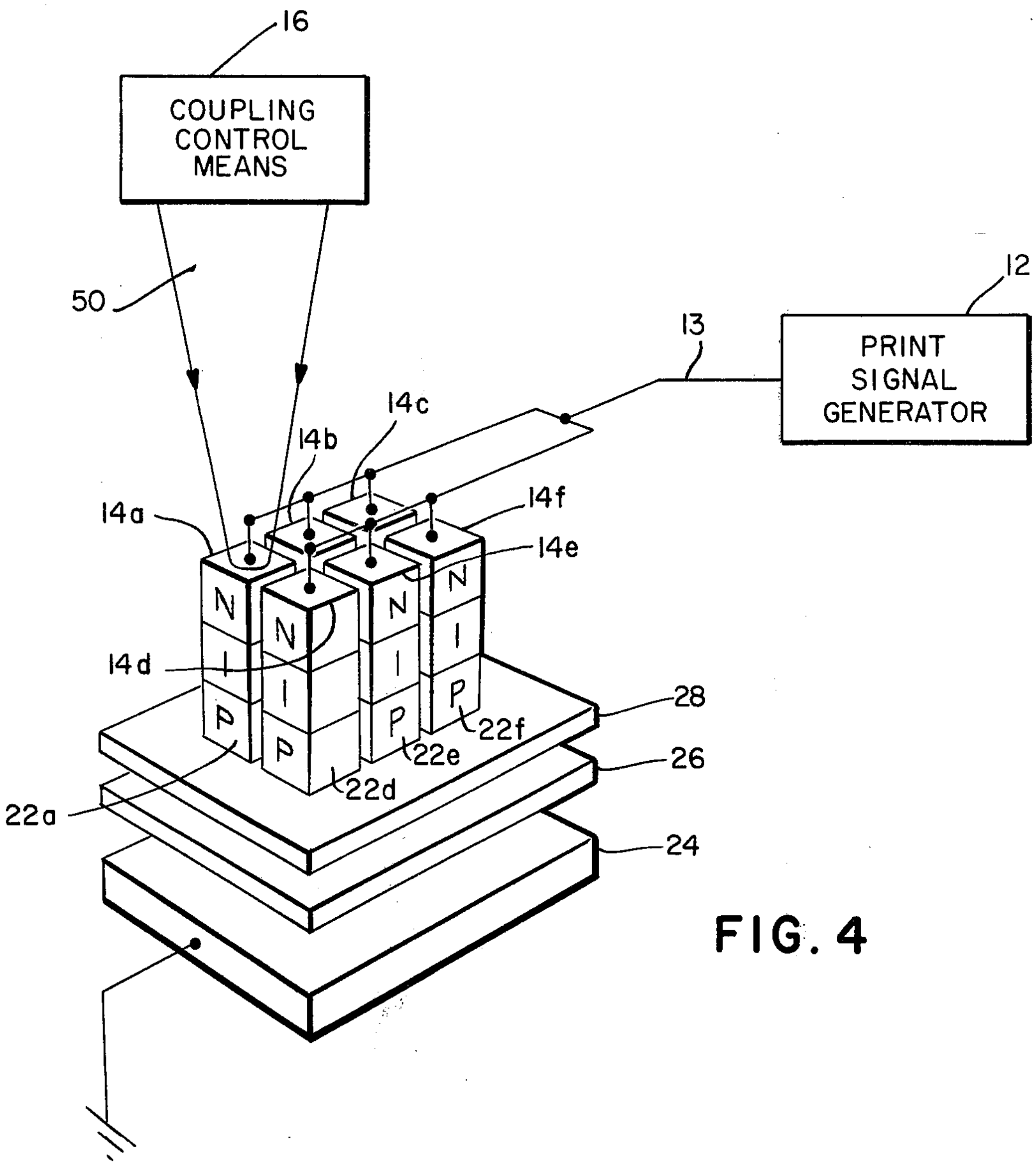

It will be understood that in other embodiments of the present invention the variable coupling means may comprise a PIN device and a light source wherein the light source has some other form than the LED described above. For example, in a facsimile printing system of FIG. 4 which is similar to that shown in FIG. 3, the control means 16 associated with each coupling means 14*a–f* may comprise a direct imaging system as the light source. In FIG. 4, elements corresponding to similar elements in FIGS. 1–3 are denoted by identical reference numerals. Such an imaging system provides one of a plurality of light beams for each of the PIN diodes, (or may sweep a light beam 50 across a matrix of PIN diodes, as shown in FIG. 4) wherein the energy of the beam incident on each diode is related to the optical density of the image-to-be reproduced at the corresponding locations of the various field shaping electrodes. In FIG. 4, the *p* region of the PIN diodes of coupling means 14*a–f* provide the field shaping electrodes 22*a*, 22*b* (not shown), 22*c* (not shown), and 22*d–f*, respectively. In the illustrated embodiment, it is assumed that the *n* region is substantially transparent to the incident light beam.

In still another alternative embodiment, an alternative semiconductor device may be used in lieu of the PIN diode of the above described embodiments. For example, a block of doped silicon may be connected between the lines 13 and 15 (FIG. 2), wherein a transverse electric field is applied across the silicon block between the terminals connecting lines 13 and 15) to create a region free of mobile charge carriers, thereby generating a depletion layer. By then directing light to be incident on the depletion layer, a selected signal coupling between the print signal generator and field shaping electrode is provided, wherein the magnitude of the signal coupling is related to the energy of the light incident on the depletion layer. Further, the incident light may be controlled so that localized regions of the depletion layer received light having a controlled energy, thereby providing a controlled spatial distribution of the signal coupling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A non-impact printing means comprising in combination:

A. a non-impact printer having at least one field shaping electrode and at least one base electrode, a recipient sheet, said recipient sheet being positioned between said field shaping and base electrodes, a donor sheet, said donor sheet being positioned between said field shaping and base electrodes and having printing particles dispersed near the surface of said donor sheet adjacent to said recipient sheet, B. a print signal generating means for generating a print signal, C. a variable coupling means associated with each field shaping electrode, each coupling means providing a selected signal coupling between said print signal generating means and the associated field shaping electrode, and D. a coupling control means for applying an associated control signal to each variable coupling means to selectively control the coupling provided by each coupling means between said generating means and the associated field shaping electrode so that a substantially amplitude scaled replica of said print signal is applied to said associated field shaping electrode.

2. The printing means according to claim 1 wherein each variable coupling means comprises:

A. a first semiconductor device connected between said print signal generating means, and the associated field shaping electrode of said printer, said first semiconductor device having a conductive state and a non-conductive state, and having a depletion layer when in said non-conductive state, and B. a variable energy light source for emitting light in response to said associated control signal applied by said coupling control means, said light source being positioned so that light emitted therefrom is incident on said depletion layer and wherein the energy of said emitted light is related to said associated control signal.

3. A printing means according to claim 2 wherein said first semiconductor device is responsive to said print signal to be in its non-conductive state.

4. A printing means according to claim 2 wherein each variable coupling means further comprises a means for biasing said first semiconductor device in its non-conductive state.

5. A printing means according to claim 2 wherein a portion of said first semiconductor device of each variable coupling means forms the associated field shaping electrode in said printer.

6. A printing means according to claim 2 wherein each variable energy light source comprises:

a second semiconductor device forming a light emitting diode, wherein said light emitting diode is responsive to said associated control signal to emit light, said control signal comprising a current passing through said light emitting diode in the forward direction, wherein the intensity of said emitted light is related to the magnitude of said forward current.

7. A device according to claim 2 wherein said variable energy light source includes means for varying the wavelength distribution of light emitted therefrom, while the intensity of said light remains substantially constant, wherein said wavelength distribution is related to said associated control signal.

8. A device according to claim 2 wherein said variable energy light source includes means for varying the intensity of the light emitted therefrom while the wavelength distribution of said light remains substantially constant, wherein said intensity is related to said associated control signal.

9. A device according to claim 2 wherein said variable energy light source includes means for varying the wavelength distribution and the intensity of the light emitted therefrom, wherein said wavelength distribution and said intensity are related to said associated control signal.

10. A device according to claim 2 wherein said first semiconductor device of each variable coupling means comprises a PIN diode.

11. A device according to claim 10 wherein each variable energy light source comprises:

a second semiconductor device forming a light emitting diode, wherein said light emitting diode is responsive to said control signal to emit light, said control signal comprising a current passing through said light emitting diode in the forward direction, wherein the intensity of said emitted light is related to the magnitude of said forward current.

12. A printing means according to claim 10 wherein the p region of said PIN diode of each variable coupling means forms the associated field shaping electrode in said printer.

13. A printing means according to claim 10 wherein the n region of said PIN diode of each variable coupling means forms the associated field shaping electrode in said printer.

14. A printing means according to claim 1 wherein each variable coupling means comprises:

A. a first and second PIN diode, each PIN diode having a substantially doped p region, a substantially doped n region and a substantially intrinsic region positioned there between, said first and second PIN diodes being connected back-to-back between said print signal generating means and the associated field shaping electrode, B. at least one light emitting diode connected so that a current applied thereto from said coupling control means passes through said light emitting diodes in the forward direction, wherein said light emitting diodes are positioned so that a light emitted therefrom is incident on the intrinsic region of said first and second PIN diodes, and wherein the intensity of light emitted from said light emitting diodes is related to the magnitude of the current applied by said coupling control means.

15. A printing means according to claim 14 wherein the p region of one of said PIN diodes of each variable coupling means forms the associated field shaping electrode in said printer.

16. A printing means according to claim 14 wherein the n region of one of said PIN diodes of each variable coupling means forms the associated field shaping electrode in said printer.

17. A non-impact printing means comprising in combination:

A. a non-impact printer having at least one field shaping electrode and at least one base electrode, a recipient sheet, said recipient sheet being positioned between said field shaping and base electrodes, a donor sheet, said donor sheet being positioned between said field shaping and base electrodes and having printing particles dispersed near the surface of said doner sheet adjacent to said recipient sheet, B. a print signal generating means for generating a print signal, and C. a variable coupling means associated with each field shaping electrode, each coupling means providing a selected signal coupling between said print signal generating means and the associated field shaping electrode so that a substantially amplitude scaled replica of said print signal is applied to said associated field shaping electrode.

18. The printing means according to claim 17 wherein each variable coupling means comprises:

A. a first semiconductor device connected between said print signal generating means, and the associated field shaping electrode of said printer, said first semiconductor device having a conductive state and a non-conductive state, and said first semiconductor device having a depletion layer when in said non-conductive state, B. a directing means for directing light incident on said first semiconductor device to be incident on said depletion layer, and C. means for varying the energy of said light directed to be incident on said depletion layer.

19. A printing means according to claim 18 wherein said first semiconductor device is responsive to said print signal to be in said non-conductive state.

20. A printing means according to claim 18 wherein each variable coupling means further comprises a means for biasing said first semiconductor device in its non-conductive state.

21. A printing means according to claim 18 wherein a portion of said first semiconductor device of each variable coupling means forms the associated field shaping electrode in said printer.

22. A method for non-impact printing comprising the steps of:

A. generating a print signal at a print signal generating means,

B. applying said print signal by way of a variable coupling means to the field shaping electrode of a non-impact printer having a field shaping electrode and a base electrode, a recipient sheet, said recipient sheet being positioned between said field shaping and base electrodes a donor sheet, said donor sheet being positioned between said field shaping and base electrodes and having printing particles dispersed near the surface of said donor sheet adjacent to said recipient sheet, C. controlling the signal coupling between said signal generating means and the field shaping electrode of said printer, said signal coupling being provided by said variable coupling means so that a substantially amplitude scaled replica of said print signal is applied to said associated field shaping electrode.

23. The method of claim 22 wherein said variable coupling means comprises:

a first semiconductor device connected between said print signal generating means and said field shaping electrode, said first semiconductor device having a conductive state and a non-conductive state, and having a depletion layer when in said non-conductive state, and said step of controlling the signal coupling includes the steps of A. biasing said semiconductor device in its non-conductive state to establish a depletion layer therein, B. directing light to be incident on said depletion layer of said semiconductor device, and C. controlling the energy of said directed light whereby the signal coupling provided by said semiconductor device is related to the energy of said light which is incident on said depletion layer.

24. The method according to claim 23 wherein said step of controlling the energy of said directed light includes the step of controlling the frequency of said directed light.

25. The method according to claim 23 wherein said step of controlling the energy of said directed light includes the step of controlling the intensity of said directed light.

26. The method according to claim 23 wherein said step of controlling the energy of said directed light includes the step of controlling the intensity and frequency of said directed light.

27. The method according to claim 23 wherein said step of directing light on said depletion layer includes the steps of positioning a light emitting diode so that light emitted therefrom is incident on the depletion layer, and applying a control signal comprising a forward current to said light emitting diode, said diode being responsive to said current to emit light, and wherein said step of controlling the energy of said directed light includes the step of controlling the magnitude of said forward current, said magnitude being related to the energy of said emitted light.

* * * * *

UNITED STATES PATENT AND TRADEMARK OFFICE

CERTIFICATE OF CORRECTION

PATENT NO. : 3,964,388

DATED : June 22, 1976

INVENTOR(S) : James C. Maxwell

It is certified that error appears in the above-identified patent and that said Letters Patent are hereby corrected as shown below:

Column 4, line 30: "$V_o = (C_e C_e + C_s) V_i$" should read --$V_o = (C_e/(C_e + C_s)) V_i$--;

Column 9, line 26: "and base electrodes a donor sheet" should read --and base electrodes, a donor sheet--.

Signed and Sealed this

Sixteenth Day of November 1976

[SEAL]

*Attest:*

RUTH C. MASON
*Attesting Officer*

C. MARSHALL DANN
*Commissioner of Patents and Trademarks*